United States Patent [19]

Swan

[11] Patent Number: 5,515,335
[45] Date of Patent: May 7, 1996

[54] SEISMIC TRACE OVERBURDEN CORRECTION METHOD

[75] Inventor: Herbert W. Swan, Richardson, Tex.

[73] Assignee: Atlantic Richfield Company, Los Angeles, Calif.

[21] Appl. No.: 107,091

[22] Filed: Aug. 16, 1993

[51] Int. Cl.$^6$ ................................................ C01V 1/36
[52] U.S. Cl. ......................... 367/47; 367/38; 367/52; 364/421
[58] Field of Search ............................ 367/38, 47, 52; 364/421

[56] References Cited

U.S. PATENT DOCUMENTS

| | | | |
|---|---|---|---|
| 4,316,268 | 2/1982 | Ostrander | 367/68 |
| 4,570,246 | 2/1986 | Herkenhoff et al. | 367/68 |
| 4,597,066 | 6/1986 | Frasier | 367/37 |
| 4,943,950 | 7/1990 | Beasley et al. | 367/50 |
| 4,995,007 | 2/1991 | Corcoran et al. | 367/52 |
| 5,258,960 | 11/1993 | Swan | 367/38 |
| 5,297,108 | 3/1994 | Swan | 367/38 |

OTHER PUBLICATIONS

Swan, H. W. ; SEG Invest. Geophys. Ser. #8, pp. 78–92, ISBN 1-56080-059-3.
Swan, H. W. ; 58 Oh Annu. SEG ortg., Nov. 3, 1988, Geophysics, vol. 56, #1, pp. 41–49.
Treadgold et al, 60 Oh Annu. SEG Int. Ortg., Sep. 27, 1990, Expanded Tech Frag. Abst. Biogr., vol. 2, pp. 1463–1466.
Landa et al, 53rd EAEG Ortg., May 30, 1991, Geophys. Prosp., vol. 41, #3, pp. 661–670.
De Bruin et al, 61st Annu. SEG Int. Ortg., Nov. 14, 1991, Expanded Tech. Prog. Abst. Biogr., vol. 2, pp. 1095–1097.
Swan, H. W., "Properties of Direct AVO Hydrocarbon Indicators"; pp. 78–92 of Offset Depth Reflectivity: Theory and Practice AVO Analysis; edited by Castagne and Backus; 1993, Society of Exploration Geophysicists.

Swan, H. W., "Amplitude versus Offset Measurment Errors in a Finely Layered Medium"; Geophysics, vol. 56, No. 1 (Jan. 1991), pp. 41–49.

Swan, H. W.; "Amplitude Versus Offset Analysis in Finely Layered Media"; Society of Exploration Geophysicists 58th Annual International Meeting and Exposition, 1988, pp. 1195–1198.

Foster, et al.; "A Closer Look at Hydrocarbon Indicators", SL2.2, Expanded Abstracts with Biographies, 1993, Technical Program, 63rd Annual Meeting and International Exhibition, Sep. 26–30, 1993, Washington, D.C. pp.731–733.

Swan, H. W., "Noise Sensitivity of Linear Seismic Inversion", SL3.3; Expanded Abstracts with Biographies, 1993 Technical Program, 63rd Annual Meeting and International Exhibition, Sep. 26–30, 1993/Washington D.C. pp. 1177–1180.

Treadgold, et al., "Amplitude versus Offset and Thin Beds", 60th Annual SEG INT MTG (San Fransisco, 90.09, 23–27) Expanded Tech Program Abstr Biogr V. 2, pp. 1463–1466, 1990.

Primary Examiner—Nelson Moskowitz
Attorney, Agent, or Firm—Albert C. Metrailer

[57] ABSTRACT

A method for generating improved displays of seismic data by processing seismic amplitude versus offset data to correct for overburden effects. Analytic traces are calculated for the zero offset reflectivity, A, trace and the amplitude versus offset slope, B, trace of the AVO data. Statistics for the A and B traces within a selected window in time and common depth point space about a selected sample point are calculated. The statistics include root mean square amplitudes of the A and B traces and the correlation coefficient. Desired statistics are selected and used with the measured statistics to correct the A and B traces.

5 Claims, 2 Drawing Sheets

SEISMIC TRACE OVERBURDEN CORRECTION METHOD

BACKGROUND OF THE INVENTION

This invention relates to an improved method for amplitude versus offset analysis of common depth point seismic traces and more particularly to a method for correcting such traces for overburden attenuation affects.

Modern seismic prospecting techniques normally employ the common depth point, CDP, or common midpoint, CMP, techniques to improve signal-to-noise ratio. In these methods, seismic signals are generated sequentially at each of a number of points along a seismic prospecting path while reflections are recorded at all of the points following generation of each signal. The recorded signals are then organized into gathers of traces each corresponding to a common depth point or common midpoint. That is, all of the traces in a gather occur from source receiver pairs equally spaced about the point in question along the prospect path. The basic purpose of this exploration technique is to allow the signals within each gather to be combined to improve signal to noise ratio. Due to the different path lengths involved in each source receiver pair, corrections must be made to the individual traces within the gather to place them in alignment before stacking. These corrections are known as normal move out, or NMO, corrections.

Various attempts have been made to analyze CDP data in order to estimate various characteristics of subsurface formations which may be used to predict the hydrocarbon bearing potential thereof. One important method is known as the amplitude versus offset, AVO, technique in which the variation in amplitude of signals reflected from given subsurface interfaces is analyzed for changes relating to the angle of incidence or offset between source and receiver pairs. In order to properly perform such analysis, all other sources of amplitude variation should be removed first. Ideally, one would like to be able to measure the AVO characteristic of each rock interface individually. In practice, however, this is not possible since seismic waves must pass through overburden layers before they reach each particular interface in question. In so doing, they undergo angle dependent absorption and reflection, which attenuates the strength of seismic energy reaching the particular interface in question. The waves reflected from the interface also suffer the same types of losses in their journey back to the surface of the earth. Errors in estimating such absorption and reflection effects can generate erroneous amplitude changes which are greater than the actual variations resulting from the change in angle of incidence.

SUMMARY OF THE INVENTION

In accordance with the present invention, I have discovered that it is possible to improve displays of seismic data by statistically measuring the AVO characteristics of reflectors within a certain range of depths, comparing these measurements with predicted statistics in the absence of losses, and then correcting the seismic data so that its statistical characteristics match the loss free predictions. In the present invention, data collected in a CDP survey is organized into gathers of traces having common midpoints. Each gather then undergoes a normal move out correction. A zero offset reflectivity trace and an amplitude versus offset slope trace are then generated from the corrected gathers. A window in time and common depth point space about a sample point is then selected. An analytic trace is then generated for each of the zero offset reflectivity and amplitude versus offset slope traces. The root mean square amplitudes of the analytic traces within the window are then calculated. The complex conjugate of the analytic slope trace is multiplied by the analytic zero offset reflectivity trace to form a complex product. The average of the complex product within the selected window is then calculated. A correlation coefficient is then calculated by dividing the average of the complex product by the product of the root mean square amplitudes of the zero offset reflectivity and amplitude versus offset traces. Desired values of the average amplitude for the zero offset reflectivity and amplitude versus offset traces and for the correlation coefficient within the window are then selected. The calculated and desired values of the average amplitudes for the zero offset reflectivity and amplitude versus offset traces and the correlation coefficient are then used to correct the measured values of the zero offset reflectivity and amplitude versus offset traces at the selected sample point. Repeating the process for each sample point provides corrected traces for use in generating improved displays of the seismic data.

DESCRIPTION OF THE DRAWINGS

The present invention may be better understood by reading the following detailed description of the preferred embodiments with reference to the accompanying drawings wherein.

DESCRIPTION OF THE PREFERRED EMBODIMENTS

The two most commonly used AVO characteristics are the zero offset reflectivity, denoted by the letter A, and the AVO gradient or slope denoted by the letter B. The former refers to the strength of the reflected signal where the location of the receiver matches that of the source. The latter refers to the rate at which the reflected signal amplitudes vary relative to the squared sine of the incident angle.

Figure 1:
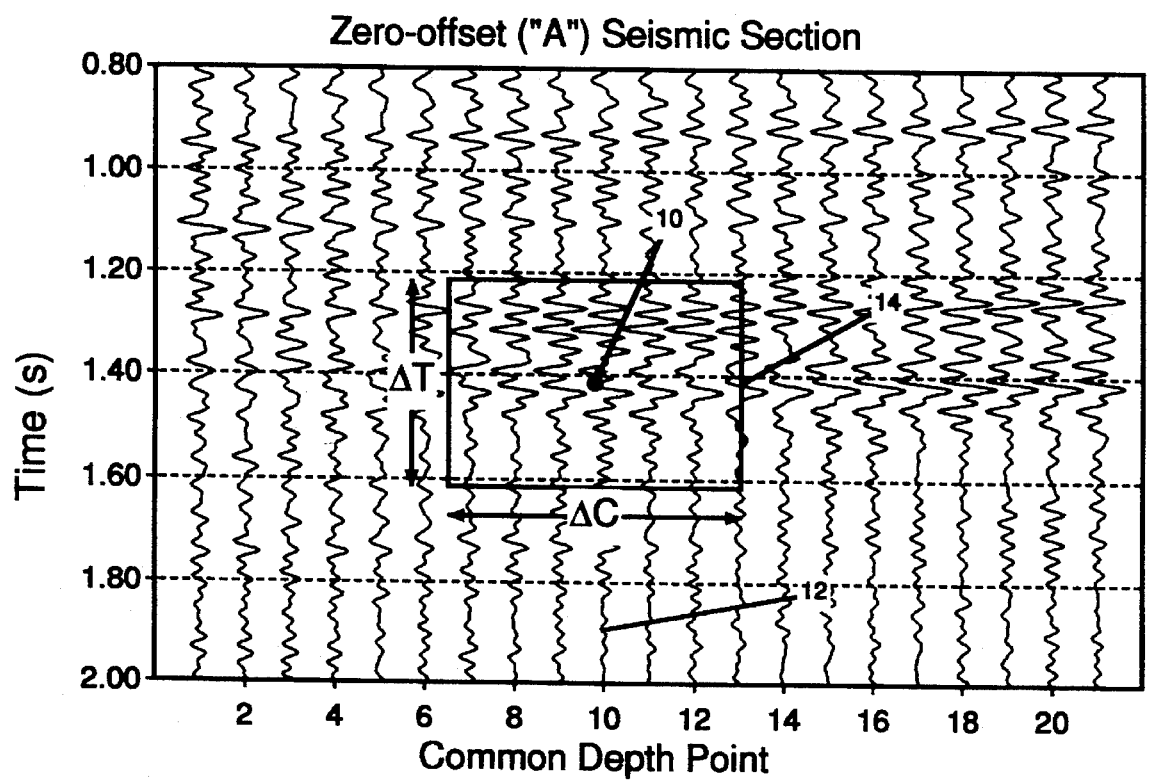
FIG. 1 is an illustration of an AVO zero offset reflectivity trace section, or A section, illustrating a selected window in time and common depth point space.
Figure 2:
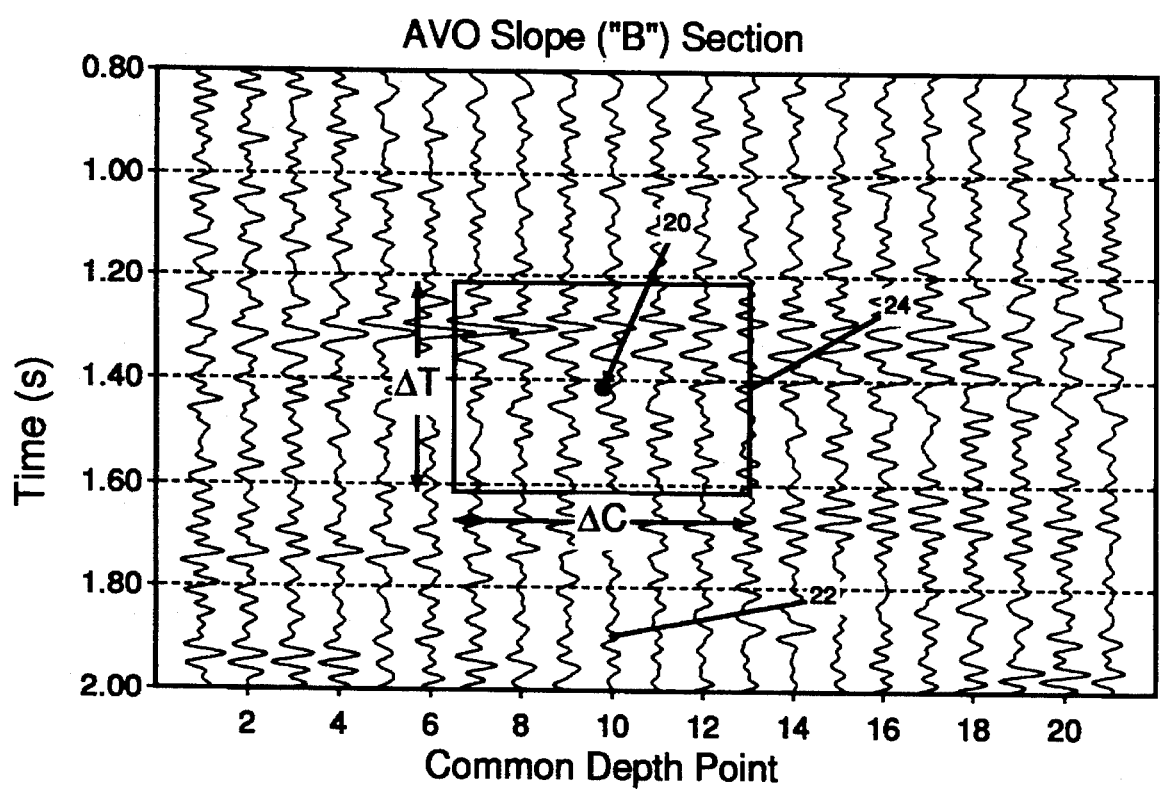
FIG. 2 is an illustration of an AVO amplitude versus offset slope trace section or B section, illustrating a window selected in time and common depth point space for analysis purposes.

FIG. 1 is a representative A trace section or display having a vertical time scale and a horizontal common depth point space or position scale. That is, each vertical trace is a plot of zero offset reflectivity versus time for a given common depth point location. In similar fashion, FIG. 2 is an AVO B section in which the amplitude versus offset slope traces are plotted versus time and common depth point space. In the present invention, it is assumed that each of the traces shown in FIGS. 1 and 2 contain some error or noise, such as attenuation caused by overburden. In FIG. 1 there is illustrated a point 10 on A trace 12 which has been selected for correction by the method of the present invention. Likewise, in FIG. 2 an analysis point 20 has been selected on trace 22. Points 10 and 20 have the same time scale location and same common depth point location. In FIGS. 1 and 2 there are also illustrated correlation windows 14 and 24 selected about the analysis points 10 and 20. Windows 14 and 24 cover the same portion of the time scales vertically and include the same set of traces on the common depth point number or space scale. In the method described herein all the data within the selected correlation window is used to analyze and make corrections to the selected points 10 and 20.

The A and B sections illustrated in FIGS. 1 and 2 represent conventional AVO processing and display techniques. Seismic data is collected by conventional common depth point prospecting as discussed above. A gather of traces having a common midpoint is then selected from the raw data for each of the common depth points illustrated in the figures. Normal move out correction of each gather is then performed. Then, zero offset reflectivity, or A, traces and amplitude versus offsets slope, or B, traces are calculated from each corrected gather of seismic traces. Each trace is then displayed at its appropriate CDP location as illustrated in FIGS. 1 and 2.

The A and B traces are then used to calculate analytic or complex traces for each of the illustrated A and B traces. Seismic traces were first represented by Taner, et al. as the real part of the analytical signal or complex trace. See the publication by Taner, et al "Complex Seismic Trace Analysis", *Geophysics* Volume 44, No. 6 (June 1979) pages 1041–63. Each analytic trace is formed by adding its corresponding real trace to i times its Hilbert transform, where i is the square root of −1.

After forming the analytic traces, several statistical characteristics of the traces are calculated. These are the root mean square, RMS amplitude, and correlation coefficient. The statistics are measured within the correlation windows 10 and 20 as illustrated in FIGS. 1 and 2. The RMS amplitudes $\sigma_a$ and $\sigma_b$ are calculated according to the following equations:

$$\sigma_a = \sqrt{\Sigma w_i |A_i|^2 / \Sigma w_i} \quad \text{Equation 1}$$

$$\sigma_b = \sqrt{\Sigma w_i |B_i|^2 / \Sigma w_i} \quad \text{Equation 2}$$

In Equations 1 and 2, "i" refers to the i-th sample within the correlation window, $|A_i|$ is the magnitude of the i-th sample of the analytic A trace; $|B_i|$ is the magnitude of the i-th sample of the analytic B trace and $w_i$ is a weighting factor given by:

$$w_i = (|A_i|^2 + |B_i|^2)^P \quad \text{Equation 3}$$

where P equals 0 for unweighted averages, P equals −½ for inversely weighted averages, and P equals −1 for inverse square weighted averages.

The correlation coefficient, r, is calculated by the following equation:

$$r = \frac{1}{\sigma_a \sigma_b} \Sigma w_i A_i B_i^* / \Sigma w_i \quad \text{Equation 4}$$

wherein $B_i^*$ is the complex conjugate of the $B_i$ trace sample.

Note that the above statistics are all calculated for all sample points of all traces lines within the correlation windows illustrated in FIGS. 1 and 2.

As noted above, the present invention is based on the fact that statistical characteristics can be predicted based on a loss free assumption or on other available data. For example, if a nearby well is available, then petrophysical analysis may be performed to obtain estimates of pressure and shear wave velocity and formation density. From these estimates, A and B reflection coefficients at each block interface may be estimated and convolved with a wavelet to obtain ideal A and B synthetic traces. The statistics of such ideal traces can then be calculated as indicated above. If a portion of the same seismic line or a nearby seismic line has been processed with good results, statistics from that portion may then be assumed to be accurate for the present invention. If such control data is not available, an estimate of the expected statistics can often be made based on an intuitive feel for the statistics of realistic A and B traces. For example, if we associate a positive real part of AB* with the occurrence of gas, then intuition would tell us that we should get considerably fewer positive AB* events than we get negative ones. This is because gas sands are more rare than wet sands. Therefore the correlation coefficient would be mildly, but uniformly negative across the section. We would also expect that this correlation coefficient would be predominantly real, since below critical angles, the Zoepritz equations predict that the reflected wave is either in phase or 180° out of phase with the incident wave. If the correlation coefficient had a large imaginary component, it would be a sign of something wrong with the data or the processing methods.

At this point in the process the measured statistics $\sigma_a$, $\sigma_b$ and r have been calculated. Based upon control data from other sources or an intuitive assumption as discussed above, desired statistics $\sigma_a^d$, $\sigma_b^d$, and $r_d$ are selected. The measured and desired statistics can then be used to generate corrected or modified A and B sections, A' and B', respectively, according to the following equations:

$$A' = \frac{\sigma_a^d}{\sigma_a} A \quad \text{Equation 5}$$

$$B' = \sigma_b^d \left( \frac{B}{\sigma_b} - r^* \frac{A}{\sigma_a} \right) \sqrt{\frac{1 - |r_d|^2}{1 - |r|^2}} + \frac{\sigma_b^d}{\sigma_a} r_d^* A \quad \text{Equation 6}$$

This final correction process can of course be repeated iteratively based on quality of results achieved. This is especially true when desired statistics are based on the intuitive assumption approach. The iterative approach also can be used as a method of testing the correctness of the assumption made by the interpreter.

The entire process may be iteratively performed with various correlation window sizes to achieve optimal results. For example, long time windows may suppress valid positive responses, if the calibration data has the A and B traces correlated to an unrealistically high degree. Short time windows, on the other hand, tend to make everything look like the data which comprises the statistics of the calibration data. Thus, exact selection of the correlation requires some judgment based on the data being corrected.

The entire process specified above is, of course, performed for each sample point on each trace on the section being corrected. The correlation window is "moved" to be centered on the particular sample point being analyzed and corrected. The corrected traces can then be used to produce new displays of the seismic data which more accurately represent the subsurface formation under study.

While the present invention has been illustrated and described with reference to particular methods of operation, it is apparent that various changes can be made therein within the scope of the present invention as defined by the appended claims.

What is claimed is:

1. A method for correcting a selected sample point on a seismic amplitude versus offset trace for overburden effects comprising:

performing seismic observations along a surface line to obtain common midpoint seismic data;

selecting a gather of traces having a common midpoint;

performing a normal move out correction of the gather of traces;

calculating a zero offset reflectivity trace and an amplitude versus offset slope trace from the corrected gather;

calculating analytic traces for each of the zero offset reflectivity and amplitude versus offset slope traces;

selecting a window in time and common depth point space about the selected sample point;

calculating the root mean squared amplitudes of the analytic zero offset reflectivity trace and analytic amplitude versus offset slope trace within the window;

multiplying the analytic zero offset reflectivity trace by the complex conjugate of the analytic slope trace, to form a complex product, calculating the average of the complex product within the window, calculating a correlation coefficient by dividing the average of the complex product by the product of the root mean squared amplitudes of the zero offset reflectivity and amplitude versus offset traces, selecting desired values of average amplitudes for the zero offset reflectivity and amplitude versus offset traces and for the correlation coefficient within the selected window;

using the calculated and desired values of the average amplitudes for the zero offset reflectivity and amplitude versus offset traces and the correlation coefficient to correct the measured values of the zero offset reflectivity and amplitude versus offset traces at the selected sample point.

2. A method according to claim 1, further including repeating the method for each sample point on the seismic trace to produce a corrected trace.

3. A method according to claim 2 further including generating a display of the corrected trace.

4. A method according to claim 1, further including repeating the method for each sample point on each of a plurality of associated traces to produce a corrected set of seismic traces.

5. A method according to claim 4, further including generating a display of the corrected set of seismic traces.

* * * * *